United States Patent [19]

Lee

[11] Patent Number: 4,611,212
[45] Date of Patent: Sep. 9, 1986

[54] FIELD COMPONENT DIVERSITY ANTENNA AND RECEIVER ARRANGEMENT

[75] Inventor: William C. Lee, Denville, N.J.
[73] Assignee: ITT Corporation, New York, N.Y.
[21] Appl. No.: 605,969
[22] Filed: May 1, 1984

Related U.S. Application Data

[63] Continuation-in-part of Ser. No. 301,926, Sep. 14, 1981, abandoned.
[51] Int. Cl.[4] .................. G01S 3/02; H01Q 21/00; H04B 1/06
[52] U.S. Cl. .................................. 343/351; 343/844; 455/273
[58] Field of Search ............... 343/844, 853, 854, 448, 343/373, 826; 455/137, 273, 269, 272, 274

[56] References Cited

U.S. PATENT DOCUMENTS

| | | | |
|---|---|---|---|
| 1,738,337 | 12/1929 | Weinberger | 455/273 |
| 2,305,917 | 12/1942 | Beers | 455/272 |
| 2,417,793 | 3/1947 | Wehner | 343/826 |
| 2,786,133 | 3/1957 | Dyke | 455/272 |
| 3,029,338 | 4/1962 | Sichak | 455/273 |
| 3,202,997 | 10/1965 | Schell | 343/854 |
| 3,222,677 | 12/1965 | Fink | 343/854 |
| 3,396,398 | 10/1968 | Dunlavy | 343/844 |
| 3,449,751 | 6/1969 | Schroeder | 343/844 |
| 3,460,144 | 10/1969 | Hannan | 343/853 |
| 3,475,687 | 10/1969 | Pierce | 455/273 |

OTHER PUBLICATIONS

Parsons et al., "Diversity Techniques for Mobile Radio Reception," Aug. 1976, IEEE Transactions on Vehicular Technology, vol. VT-25, No. 3.

*Primary Examiner*—Theodore M. Blum
*Assistant Examiner*—David C. Cain
*Attorney, Agent, or Firm*—John T. O'Halloran; Thomas F. Meagher

[57] ABSTRACT

The field component diversity antenna and receiver arrangement comprises at least a first pair of parallel spaced, straight, vertical elemental antenna elements disposed substantially parallel to the electric field component of a transmitted signal to receive the transmitted signal in a multipath fading environment where the electric field and magnetic field components are uncorrelated and a 180° hybrid circuit coupled to the first pair of spaced antenna elements to provide a first output signal proportional to the electric field components and a second output signal proportional to the magnetic field component. The spaced elemental antenna elements may be monopole elements or dipole elements. The pair of antenna element may be connected together by a straight conductor to enhance the magnetic field component. The first and second output signals may be combined by known diversity combining arrangement to achieve a diversity advantage.

39 Claims, 14 Drawing Figures

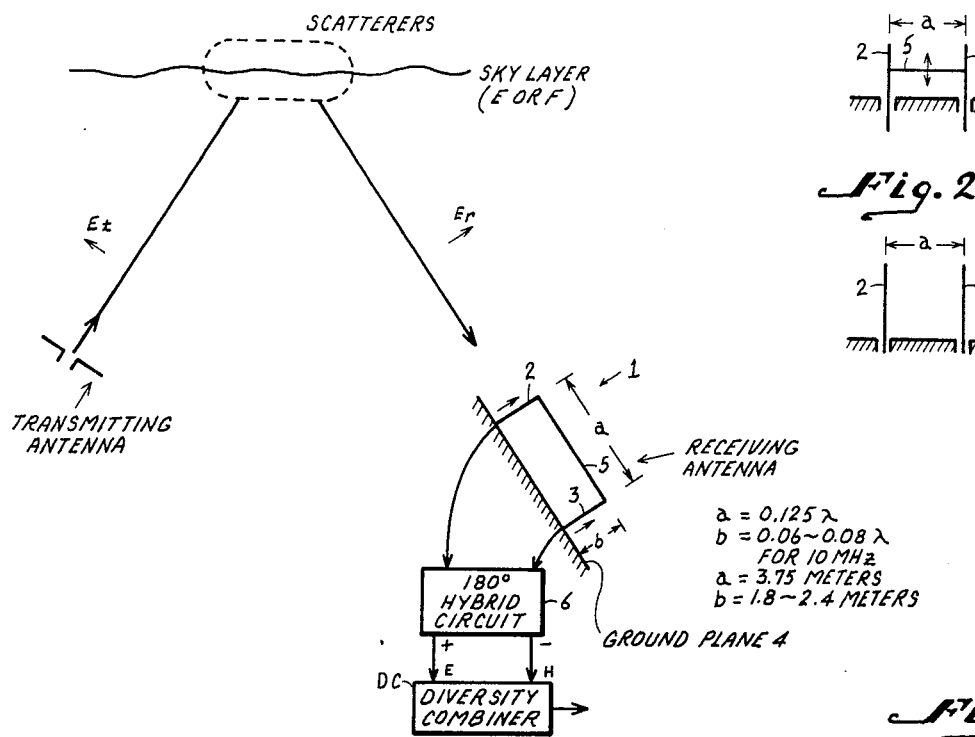
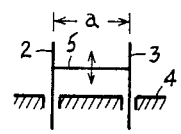
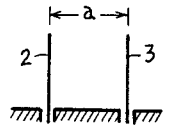
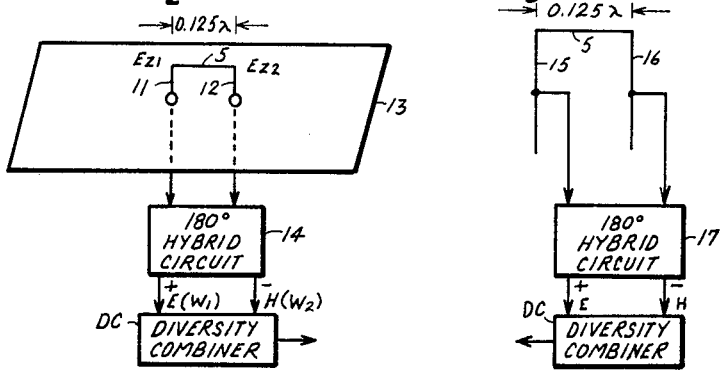
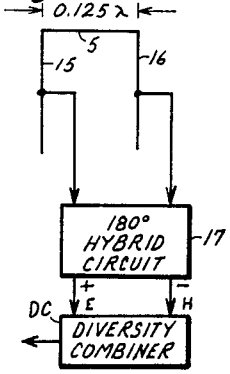
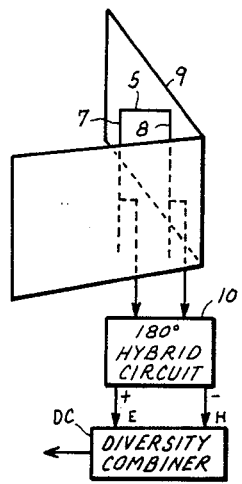
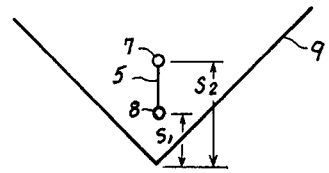

FIELD COMPONENT DIVERSITY ANTENNA AND RECEIVER ARRANGEMENT

CROSS-REFERENCE TO RELATED APPLICATIONS

This is a continuation-in-part application of copending application Ser. No. 301,926, filed Sept. 14, 1981, now abandoned.

BACKGROUND OF THE INVENTION

The present invention relates to antenna and receiver arrngements and more particularly to a diversity antenna and receiver arrangement to receive a transmitted signal in a multipath fading environment.

In the HF (high frequency) and VHF (very high frequency) range, space diversity and angle-arrival diversity need either many spaced antennas or a large size directional antenna which are often not very practical because of the large wavelength in this frequency range. Polarization diversity has a 3.0 dB (decibel) power degradation by using two polarized transmitting antennas for diversity purposes.

SUMMARY OF THE INVENTION

An object of the present invention is to provide a simple diversity antenna and receiver arrangement for utilization in the HF and VHF frequency range.

Another object of the present invention is to provide a simple field component diversity antenna and receiver arrangement for the HF and VHF frequency range.

A feature of the present invention is the provision of a field component diversity antenna arrangement to receive uncorrelated electric field and magnetic field components of a transmitted signal in a multipath fading environment comprsing: at least a first pair of parallel spaced, straight, vertical elemental antenna elements disposed substantially parallel to the electric field component to receive the transmitted signal; a first straight conductor connecting the first pair of antenna elements together to enhance the magnetic field component; and a first 180° hybrid circuit coupled to the first pair of spaced antenna elements to provide a first output signal proportional to the electric field component and a second output signal proportional to the magnetic field component.

Another feature of the present invention is the provision of a field component diversity antenna arrangement to receive uncorrelated electric field and magnetic field components of a trnsmitted signal in a multipath fading environment comprising: at least a first pair of parallel spaced, straight, vertical elemental antenna elements disposed substantially parallel to the electric field component to receive the transmitted signal and a first 180° hybrid circuit coupled to the first pair of spaced antenna elements to provide a first output signal proportional to the electric field component and a second output signal proportional to the magnetic field component.

A further feature of the present invention is the provision of a field component diversity receiver comprising: a field component diversity antenna arrangement to receive uncorrelated electric field and magnetic field components of a transmitted signal in a multipath fading environment including at least a first pair of parallel spaced, straight, vertical element antenna elements disposed substantially parallel to the electric field component to receive the transmitted signal, a first straight conductor connecting the first pair of antenna elements together to enhance the magnetic field component, and a first 180° hybrid circuit coupled to the first pair of spaced antenna elements to provide a first output signal proportional to the electric field component and a second output signal proportional to the magnetic field component; and diversity combiner means coupled to the first hybrid circuit to combine the first and second output signals.

Still another feature of the present invention is the provision of a field component diversity receiver comprising: a field component diversity antenna arrangement to receive uncorrelated electric field and magnetic field components of a transmitted signal in a multipath fading environment including at least a first pair of paralel spaced, straight, vertical elemental antenna elements disposed substantially parallel to the electric field component to receive the transmitted signal, and a first 180° hybrid circuit coupled to the first pair of spaced antenna elements to provide a first output signal proportional to the electric field component and a second output signal proportional to the magnetic field component; and diversity combiner means coupled to the first hybrid circuit to combine the first and second output signals.

Usually a dipole antenna is used to receive an electric wave and a loop antenna is used to receive a magnetic field. In accordance with the principles of the present invention an antenna arrangement will be employed which can receive both the electric field and the magnetic field at the same time. Based upon a multipath fading or reflection phenomena it has been proved that the electric field component and the magnetic field component are received uncorrelated in a troposcatter communication link or other fading environments, such as moble radio environment.

The reason for using the field component diversity antenna rrangement is that the separation of elemental antenna elements can be much smaller than that required in usual space diversity and is independent of the frequency above the design frequency of the antenna. The implementation of this type of antenna is simple and the signal performance due to this diversity antenna arrangement is effective especially at the HF and VHF frequency range.

BRIEF DESCRIPTION OF THE DRAWING

Above-mentioned and other features and objects of this invention will become more apparent by reference to the following description taken in conjunction with the accompanying drawing, in which:

FIG. 1 is an illustration of a field component diversity antenna arrangement in accordance with the principles of the present invention in a multipath fading environment employed in combination with any known diversity combiner;

FIGS. 2A and 2B illustrate schematically various arrangements of the straight conductor interconnecting the pair or pairs of elemental antenna elements of the various embodiments disclosed herein;

FIG. 3 is a top view of one embodiment of a practical field component diversity antenna arrangement in accordance with the principles of the present invention;

FIG. 4 is a perspective view of the antenna of FIG. 2 employed in combination with any known diversity combiner;

FIG. 5 is another embodiment of the field component diversity antenna arrangement in accordance with the principals of the present invention employed in combination FIG. 6 is a third embodiment of a field component diversity antenna arrangement in accordance with the principles of the present invention employed in combination with any known diversity combiner;

DESCRIPTION OF THE PREFERRED EMBODIMENTS

Figure 7:
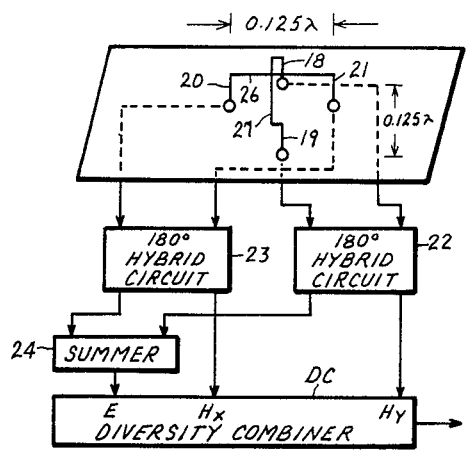
FIG. 7 is a fourth embodimeent of thefield component diversity antenna arrangement in accordance with the principles of the present invention employed in combination with any known diversity combiner.

Referring to FIG. 1, there is illustrated therein a theoretical field component diversity antenna arrangement in a multipath fading environment in combination with any known diversity combiner. The theoretical field component diversity antenna arrangement 1 includes two parallel, spaced straight, vertical elemental antenna elements 2 and 3 extending from a ground plane 4 in a perpendicular relation therewith. Elements 2 and 3 are spaced from each other a distance a and connected by a straight conductor 5 to essentially form a rectangular loop.

The following have been proven experimentally. Conductor 5 may be connected between the tops of elements 2 and 3 as shown in FIG. 1 to enhance the received magnetic field component (derive a large voltage from the received magnetic field component) when the distance a between elements 2 and 3 is small. When the distance a is large, the magnetic field does not need enhancement and, therefore, conductor 5 may be eliminated as shown in FIG. 2B. As shown in FIG. 2A conductor 5 may have its position along elements 2 and 3 adjusted in order to obtain equal amplitude votages in response to the received electric field and magnetic field components. This adjusting capability enable achievement of the maximum benefit or advantage from the diversity combiner.

It has been shown experimentally that once the antenna arrangement has been manufactured to provide the proper length of the pair of antenna elements 2 and 3 and the proper spacing a between the pair of antenna elements 2 and 3 at the operating frequency, the antenna arrangement is independent of frequency above the operating or design frequency.

The foregoing experimental results are not only true of the embodiment of FIG. 1, but is true for all of the other embodiments of FIGS. 3–12.

The output from each of the antenna elements 2 and 3 is coupled to a 180° hybrid circuit 6 to obtain an electric field component output signal E by summing the two inputs to hybrid circuit 6 and to obtain a magnetic field component output signal H by subtracting one input thereto from the other input thereto.

The output signals E and H have been proven to be independent signals after passing through a multipath reflection or fading medium; see, for instance, an article by W. C. Y. Lee, Bell System Technical Journal, Vol. 46, page 417, Feb. 1967. Once two independent signals are obtained, any kind of diversity combining techniques can be used to realize the advantage of the diversity scheme. This is indicated by diversity combiner DC. Various combining techniques that can be employed are disclosed in the book by Schwartz, Bennett and Stein entitled "Communication Systems and Techniques:," McGraw-Hill, 1966, pages 416–498.

The dimensions illustrated in FIG. 1 are for an operating frequency of 10 MHz (megehertz) and hybrid circuit 6 is an off-the-shelf item that is obtainable from a number of different manufacturers, for instance, Narda and Triplated.

FIGS. 3 and 4 illustrate one practical embodiment of the field component diversity antenna arrangement of the present invention. This embodiment is a corner reflector antenna having the two elemental antenna elements 7 and 8 spaced an amount 0.125[ (wavelength) at the operating frequency of the antenna in a cooperative association with a corner reflector 9. The elemental antenna elements 7 and 8 are dipole elements whose outputs are coupled to a 180° hybrid circuit 10 to produce the E and H output signals. Conductor 5 can also be proved when it is desired to enhance the magnetic field component H.

FIG. 5 shows a second practical embodiment of the field component diversity antenna arrangement of the present invention including two monopole elemental antenna elements 11 and 12 in a cooperative relationship with a ground plane 13. Monopole antenna elements 11 and 12 are separated by 0.125λ and are connected to a 180° hybrid circuit 14 to provide the E and H output signals. Again conductor 5 can be provided when it is desired to enhance the magnetic field component H.

FIG. 6 shows a third practical embodiment of the field component diversity antenna arrangement of the present invention including elemental dipole antenna elements 15 and 16 whose outputs are coupled to a 180°hybrid circuits 17 to produce the E and H output signals. Conductor 5 can again be provided if it is desired to enhance the magnetic field component H.

Referring to FIG. 7, there is illustrted therein a fourth practical embodiment of the field component diversity antenna arrangement having two pairs of elemental antenna elements with the first pair of antenna elements 18 and 19 being oriented at right angles with respect to the second pair of antenna elements 20 and 21 with each of the elements of each of the pair of elements being spaced 0.125λ from each other. The output from antenna elements 18 and 19 area coupled to a 180° hybrid circuit 22 and the output of antenna elements 20 and 21 are coupled to a 180° hybrid circuit 23. Hybrid circuits 22 and 23 produce two components of the H output signal, namely, Hx and Hy components and two electric field component output signals which are combined in summer 24 to provide an E output signal. A conductor 26 similar to conductor 5 may be provided between antenna elements 20 and 21 to enhance magnetic field component Hx and a conductor 27 similar to conductor 5 may be provided between antenna elements 18 and 19 to enhance magnetic field component Hy.

Figure 8:
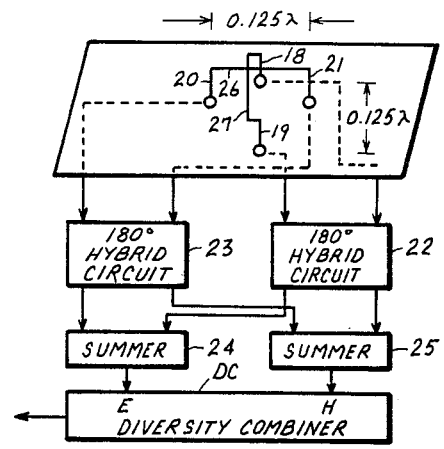
FIG. 8 is a fifth embodiment of the field component diversity antenna arrangement in accordance with the principles of the present invention employed in combination with any known diversity combiner.

FIG. 8 shows a modification of the embodiment of FIG. 6 wherein a second summer 25 is employed to combine the H signal components Hx and Hy to provide a H signal output from the antenna arrangements.

The embodiments shown in FIG. 5 to 8 are particularly useful in mobile communcations. For instance, at 30 MHz the wavelength of 10 meters. The separation for space diversity requires one half wavelength, i.e., 5 meters. It becomes impossible to mount two antennas separated 5 meters apart on the roof of a jeep or regular vehicle. For this reason, the field component diversity antenna arrangement has great merit. It only needs a separation of $0.125\lambda$ between the two antenna elements. Therefore, the two antenna elements need to e spaced only 1.25 meters apart. The embodiments of FIGS. 7 and 8 are improvements in the embodiments of FIG. 5 and 6 to improve the efficiency thereof in mobile communication application, but the advantage is still there in all of the embodiments, namely, the ability to provide separation between one or two pairs of antenna elements which can be accommodated on a jeep or other regular vehicles.

Figure 9:
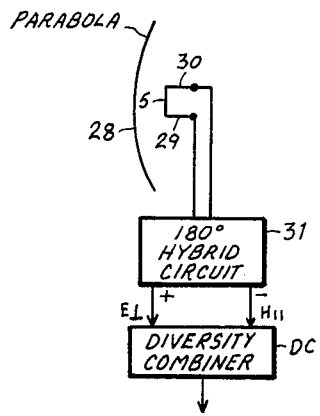
FIGS. 9–12 are additional embodiments of the field component diversity antenna arrangement in accordance with the principles of the present invention employed in conjunction with any known diversity combiner.

FIG. 9 is a schematic illustration of a field component diversity antenna and receiver arrangement employing a parabola 28 and a pair of straight elemental antenna elements 29 and 30 interconnected by a conductor 5 in a cooperative relationship. The outputs of elements 29 and 30 are coupled to 180° hybrid circuit 31 to produce the E and H output signals which are combined in diversity combiner DC.

Figure 10:
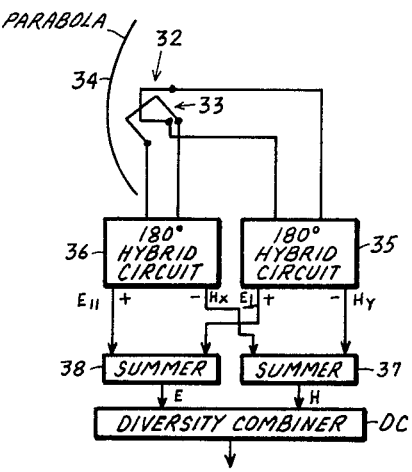

FIG. 10 is a schematic illustration of a field component diversity antenna and receiver arrangement employing two pairs of elemental antenna elements 32 and 33 in a crossed loop arrangement similar to that shown in FIGS. 7 and 8 in a cooperative relationship with a parabola 34. The outputs from antenna pair 32 are coupled to 180° hybrid circuit 35 and the outputs from antenna pair 33 are coupled to 180° hybrid circuit 36. Hybrid circuits 35 and 36 produce two magnetic field components and two electric field components. The two magnetic field components are combined in summer 37 and the two electric field components are combined in summer 38. The output signals of summers 37 and 38 are combined in diversity combiner DC to achieve the desired diversity advantage.

Figure 11:
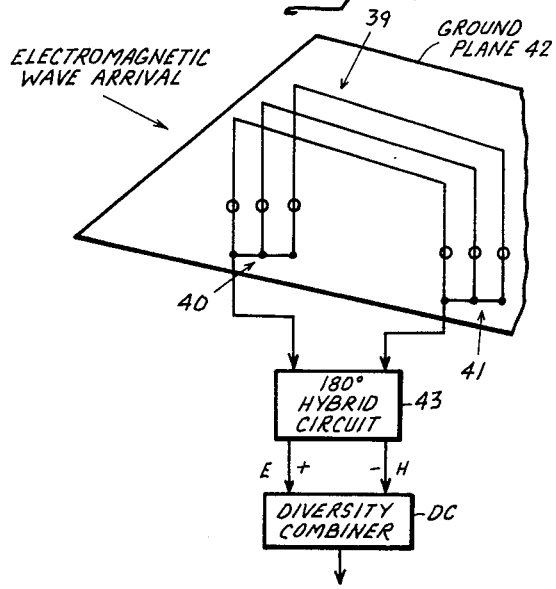
Figure 12:
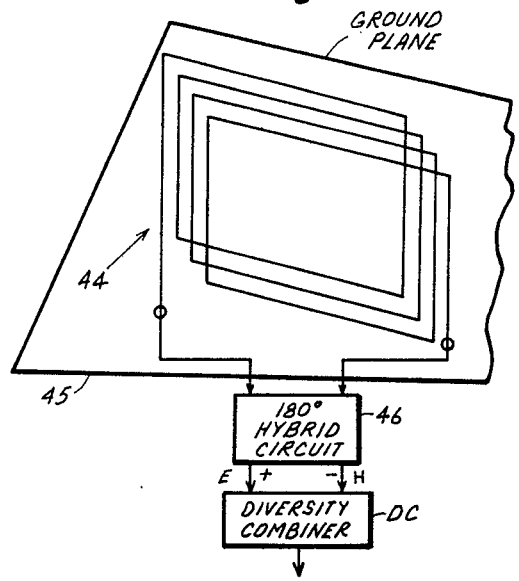

FIGS. 11 and 12 illustrate schematically two embodiments of a field component diversity antenna and receiver arrangement to provide increased gain. The embodiment of FIG. 11 includes a plurality of rectangular loops 39 connected together at points 40 and 41 under the cooperating ground plane 42. The outputs are coupled to 180° hybrid circut 43 and diversity combiner DC as in the previous embodiments. The magnitude of the voltage resulting from the magnetic field component is proportional to the sum of the area of each of the plurality of rectangular loops 39 and the magnitude of the voltage resulting from the electric field component is proportional to number vertical portions of the plurality of rectangular loops 39.

The embodiments of FIG. 12 includes a rectangular winding-coil type configuration 44 in a cooperative relationship with a ground plane 45. The outputs from configuration 44 are coupled to 180° hybrid circuit 46 and diversity combiner DC as in the previous embodiments. The magnitude of the voltage resulting from the magnetic field component is proportional to the sum of the area of each of the plurality of turns of the configuration 44 and the magnitude of the voltage resulting from the electric field component is proportional to the number of vertical portions of the plurality of rectangular turns of the configuration 44.

Figure 13:
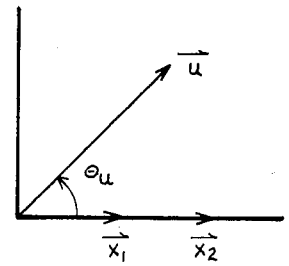
FIG. 13 is a graph useful in explaining the principle of the field component diversity antenna arrangement of the present invention.

The principle of the field component diversity antenna arrangement of the present application will now be set forth. Assume that there are two electric fields, $Ez_1$ and $Ez_2$ expressed as:

$$Ez_1 = \sum_{u=1}^{N} A_u \exp(-j\beta \vec{u} \cdot \vec{x_1}) = X_1 + jY_1 \quad (1)$$

and $$Ez_2 = \sum_{u=1}^{N} A_u \exp(-j\beta \vec{u} \cdot \vec{x_2}) = X_2 + jY_2 \quad (2)$$

where $A_u$ is a complex amplitude of an electric wave propagating at a direction $\vec{u}$, and $\vec{u}$ is a unit vector related to an angle $\theta_u$ between $\vec{u}$ and $\vec{x}$ as shown in FIG. 13. $\beta$ is the wave number and N is the number of wave arrivals. $Ez_1$ and $Ez_2$ can also be expressed in real and imaginary parts as shown in equations (1) and (2), respectively.

The two outputs $W_1$ and $W_2$ of a field component diversity antenna as shown in FIG. 5 can be expressed as:

$$W_1 = Ez_1 + Ez_2 = (X_1+X_2) + j(Y_1+Y_2) \quad (3)$$

$$W_2 = Ez_1 - Ez_2 = (X_1-X_2) + j(Y_1-Y_2) \quad (4)$$

The correlation of the two signals $W_1$ and $W_2$ is $$\overline{W_1 W_2^*} = \overline{(X_1^2 - X_2^2)} + \overline{(Y_1^2 - Y_2^2)} + 2j\overline{(X_1Y_2 - Y_1X_2)}$$

$$= 2j\overline{(X_1Y_2 - Y_1X_2)}$$

$$= 0,$$

since communications. $\overline{X_1Y_2} = \overline{Y_1X_2} = 0.$ (5)

It can be proved by taking equations (1) and (2) and averaging the product terms as indicated in equation (5) that the two outputs $W_1$ and $W_2$ are uncorrelated.

Secondly, equations (3) and (4) will be examined. If $Ez_1$ and $Ez_2$ are highly correlated, then the mean value of $W_2$, $W_2$ is much smaller than $W_1$. There is no advantage in combining them even when $W_1$ and $W_2$ are uncorrelated. In order to keep $W_1$ and $W_2$ the same, it may be necessary to let the envelope correlation of $Ez_1$ and $Ez_2$ be 0.5 as follows:

$$\rho|Ez_1 - Ez_2 - (x_1-x_2) = J_o^2(\beta(x_1-x_2)) = 0.5. \quad (6)$$

where $J_o(.)$ is the Bessel function of the first kind of zero order. From equation (6)

$$J_o(\beta(x_1 - x_2)) = 0.707 \quad (7)$$
$$\beta(x_1 - x_2) = 1.1$$

$$x_1 - x_2 = \frac{1.1}{2\pi} \lambda = 0.175\lambda.$$

Hence, from the theoretical analysis, the spacing between the two elemental antenna elements is $0.175\lambda$, but from the experimental results, the spacing between the elemental antenna elements if 0.125λ, which is smaller than the theoretical value.

While I have described above the principles of my invention in connection with specific apparatus, it is to be clearly understood that this description is made only by way of example and not as a limitation to the scope of my invention as set forth in the objects thereof and in the accompanying claims.

I claim:

1. A field component diversity antenna arrangement to receive uncorrelated electric field and magnetic field components of a transmitted signal in a multipath fading environment comprising
at least a first pair of parallel spaced straight, vertical elemental antenna elements disposed substantially parallel to said electric field component to receive said transmitted signal;
a first straight conductor connecting said first pair of antenna elements together to enhance said magnetic field component;
a first 180° my hybrid ciruit coupled to said first pair of spaced antenna elements to provide a first output signal proportional to said electric field component and a second ouput signal proportional to said magnetic field component; and
a diversity combiner coupled to said hybrid circuit for combining said first and second output signals, wherein said first straight conductor is adapted so as to have its position along said first pair of antenna elements adjustable in order to obtain equal amplitude voltages in response to said received electronic field and magnetic field components.

2. An antenna arrangement according to claim 1, wherein
each of said first pair of antenna elements has a length of 0.06 to 0.08 wavelengths at an operating frequency of said antenna and are separated from each other by 0.125 wavelengths at said operating frequency.

3. An antenna arrangement according to claim 1, wherein
each of said first pair of antenna elements for a dipole element is an operative association with a corner reflector.

4. An antenna arrangement according to claim 2, wherein
each of said first pair of antenna elements is a monopole element in operative assocation with a parabola.

5. An antenna arrangement according to claim 2, wherein
each of said first pair of antenna elements is a dipole element in an operative association with a corner reflector.

6. An antenna arrangement according to claim 1, wherein
each of said first pair of antenna elements is a monopole element in operative association with a parabola.

7. An antenna arrangement according to claim 1, further including
a second pair of parallel, spaced, straight, vertical elemental antenna elements disposed substantially parallel to said electric field component and oriented in a predetermined manner with respect to said first pair of antenna elements;
a second straight conductor connecting said second pair of antenna elements together to enhance said magnetic field component; and
a second 180° hybrid circuit coupled to said second pair of antenna elements to provide a third output signal proportional to said electric field component and a fourth output signal proportional to said magnetic field component, wherein
each of said first and second pair of antenna elements has a length of 0.06 to 0.08 wavelengths at an operating frequency of said antenna, each of said first pair of antenna elements is separated from each other by 0.125 wavelengths at said operating frequency and each of said second pair of antenna elements is separated from each other by 0.125 wavelengths at said operating frequency.

8. An antenna arrangement according to claim 1, further including
a second pair of parallel, spaced, straight, vertical elemental antenna elements disposed substantially parallel to said electric field component and oriented in a predetermined manner with respect to said first pair of antenna elements;
a second straight conductor connecting said second pair of antenna elements together to enhance said magnetic field component; and
a second 180° hybrid circuit coupled to said second pair of antenna elements to provide a third output signal proportional to said electric field component and a fourth output signal proportional to said magnetic field component, wherein
each of said first and second pair of antenna elements is a monopulse antenna in operative association with a common ground plane, further including
a first summer to combine said first and third output signals; and
a second summer to combine said second and fourth output signals.

9. An antenna arrangement according to claim 1, further including
a second pair of parallel, spaced, straight, vertical elemental antenna elements disposed substantially parallel to said electric field component and oriented in a predetermined manner with respect to said first pair of antenna elements;
a second straight conductor connecting said second pair of antenna elements together to enhance said magnetic field component; and
a second 180° hybrid circuit coupled to said second pair of antenna elements to provide a third output signal proportional to said electric field component and a fourth output signal proportional to said magnetic field component, wherein
each of said first and second pair of antenna elements is a monopulse antenna in operative association with a common ground plane, further including
a summer to combine said first and third output signals.

10. An antenna arrangement according to claim 1, further including
a second pair of parallel, spaced, straight, vertical elemental antenna elements disposed substantially parallel to said electric field component and oriented in a predetermined manner with respect to said first pair of antenna elements;
a second straight conductor connecting said second pair of antenna elements together to enhance said magnetic field component; and a second 180° hybrid circuit coupled to said second pair of antenna elements to provide a third output signal proportional to said electric field component and a fourth output signal proportional to said magnetic field component, wherein each of said first and second pair of antenna elements is a monopole antenna in operative association with a parabola.

11. An antenna arrangement according to claim 1, further including a plurality of said first pair of antenna elements disposed in a parallel relationship with one another above a ground plane; and a plurality of said first conductors each connected between a different one of said plurality of said first pair of antenna elements;

each of said plurality of said first pair of antenna elements being connected together below said ground plane for coupling to said hybrid.

12. An antenna arrangement according to claim 1, further including a plurality of said first conductors and a plurality of said first pair of antenna elements interconnected to form a continuous rectangular winding-type configuration disposed in an operative association with a ground plane;

each end of said configuration being coupled to said hybrid.

13. A field component diversity antenna arrangement to receive uncorrelated electric field and magnetic field components of a transmitted signal in a multipath fading environment comprising:

at least a first pair of parallel spaced, straight, vertical elemental antenna elements disposed substantially parallel to said electric field component to receive said transmitted signal; and a first 180° hybrid circuit coupled to said first pair of spaced antenna elements to provide a first output signal proportional to said electric field component and a second output signal proportional to said magnetic field component wherein each of said first pair of antenna elements has a length of 0.06 to 0.08 wavelengths at an operating frequency of said antenna and are separated from each other by 0.125 wavelengths at said operating frequency.

14. An antenna arrangement according to claim 13, wherein each of said first pair of antenna elements is a dipole element in an operative association with a corner reflector.

15. An antenna arrangement according to claim 13 wherein each of said first pair of antenna elements is a monopole element in operative association with a parabola.

16. An antenna arrangement according to claim 13, wherein each of said first pair of antenna elements is a dipole element in an operative association with a corner reflector.

17. An antenna arrangement according to claim 13, wherein each of said first pair of antenna elements is a monopole element in operative association with a parabola.

18. An antenna arrangement according to claim 17, further including a summer to combine said first and third output signals.

19. An antenna arrangement according to claim 13, further including a second pair of parallel, spaced, straight, vertical elemental antenna elements disposed substantially parallel to said electric field component and oriented in a predetermined manner with respect to said first pair of antenna elements; and a second 180° hybrid circuit coupled to said second pair of antenna elements to provide a third output signal proportional to said electric field component and a fourth output signal proportional to said magnetic field component, wherein each of said first and second pair of antenna elements is a monopole antenna in operative association with a parabola.

20. An antenna arrangement according to claim 13, further including a second pair of parallel, spaced, straight, vertical elemental antenna elements disposed substantially parallel to said electric field component and oriented in a predetermined manner with respect to said first pair of antenna elements; and a second 180° hybrid circuit coupled to said second pair of antenna elements to provide a third output signal proportional to said electric field component and a fourth output signal proportional to said magnetic field component, wherein each of said first and second pair of antenna elements has a length of 0.06 to 0.08 wavelengths at an operating frequency of said antenna, each of said first pair of antenna elements is separated from each other by 0.125 wavelengths at said operating frequency and each of said second pair of antenna elements is separated from each other by 0.125 wavelengths at said operating frequency, wherein each of said first and second pair of antenna elements is a monpole antenna in operative association with a parabola.

21. A field component diversity receiver comprising:

a field component diversity antenna arrangement to receive uncorrelated electric field and magnetic field components of a transmitted signal in a multipath fading environment including:

at least a first pair of parallel spaced, straight, vertical elemental antenna elements disposed substantially parallel to said electric field component to receive said transmitted signal, a first straight conductor connecting said first pair of antenna elements together to enhance said magnetic field component, and a first 180° hybrid circuit coupled to said first pair of spaced antenna elements to provide a first output signal proportional to said electric field component and a second output signal proportional to said magnetic field component; and diversity combiner means coupled to said first hybrid circuit to combine said first and second output signals, wherein said first straight conductor is adapted so as to have its position along said first pair of antenna elements adjustable in order to obtain equal amplitude voltages in response to said received electronic field and magnetic field components.

22. A diversity receiver according to claim 21, wherein each of said first pair of antenna elements has a length of 0.06 to 0.08 wavelengths at an operating frequency of said antenna and are separated from each other by 0.125 wavelengths at said operating frequency.

23. A diversity receiver according to claim 21, wherein
each of said first pair of antenna elements is a dipole element in an operative association with a corner reflector.

24. A diversity receiver according to claim 22, wherein
each of said first pair of antenna elements is a monopole element in operative association with a common ground plane.

25. A diversity receiver according to claim 22, wherein
each of said first pair of antenna elements is a dipole element in an operative association with a corner reflector.

26. A diversity receiver according to claim 21, wherein
each of said first pair of antenna elements is a monpole element in operative association with a parabola.

27. A diversity receiver according to claim 22, wherein
each of said first pair of antenna elements is a monopole element in operative association with a parabola.

28. A diversity receiver according to claim 21, further including
a second pair of parallel spaced, straight, vertical elemental antenna elements disposed substantially parallel to said electric field component and oriented in a predetermined manner with respect to said first pair of antenna elements;
a second straight conductor connecting said second pair of antenna elements together to enhance said magnetic field component; and
a second 180° hybrid circuit coupled to second pair of antenna elements to provide a third output signal proportional to said electric field component and a fourth output signal proportional to said magnetic field component, wherein
each of said first and second pair of antenna elements is a monopole antenna in operative association with a parabola.

29. A diversity receiver according to claim 21, further including
a second pair of parallel spaced, straight, vertical elemental antenna elements disposed substantially parallel to said electric field component and oriented in a predetermined manner with respect to said first pair of antenna elements;
a second straight conductor connecting said second pair of antenna elements together to enhance said magnetic field component; and
a second 180° hybrid circuit coupled to second pair of antenna elements to provide a third output signal proportional to said electric field component and a fourth output signal proportional to said magnetic field component, wherein
each of said first and second pair of antenna elements has a length of 0.06 to 0.08 wavelengths at an operating frequency of said antenna, each of said first pair of antenna elements is separated from each other by 0.125 wavelengths at said operating frequency and each of said second pair of antenna elements is separated from each other by 0.125 wavelengths at said operating frequency, wherein
each of said first and second pair of antenna elements is a monopole antenna in operative association with a parabola.

30. A diversity receiver according to claim 21, further including
a plurality of said first pair of antenna elements disposed in a parallel relationship with one another above a ground plane; and
a plurality of said first conductors each connected between a different one of said plurality of said first pair of antenna elements;
each of said plurality of said first pair of antenna elements being connected together below said ground plane for coupling to said hybrid.

31. A diversity receiver according to claim 21, further including
a plurality of said first conductors and a plurality of said first pair of antenna elements interconnected to form a continuous rectangular winding-type configuration disposed in an operative association with a ground plane;
each end of said configuration being coupled to said hybrid.

32. A field component diversity receiver comprising:
a field component diversity antenna arrangement to receive ucorrelated electric field and magnetic field components of a transmitted signal in a multipath fading environment including:
at least a first pair of parallel spaced, straight, vertical elemental antenna elements disposed substantially parallel to said electric field component to receive said transmitted signal, and
a first 180° hybrid circuit coupled to said first pair of spaced antenna elements to provide a first output signal proportional to said electric field component and a second output signal proportional to said magnetic field component; and
diversity combiner means coupled to said first hybrid circuit to combine said first and second output signals,
each of said first pair of antenna elements has a length of 0.06 to 0.08 wavelengths at an operating frequency of said antenna and are separated from each other by 0.125 wavelengths at said operating frequency.

33. A diversity receiving according to claim 32, wherein
each of said first pair of antenna elements is a dipole element in an operative association with a corner reflector.

34. A diversity receiver according to claim 32, wherein
each of said first pair of antenna elements is a dipole element in an operative association with a corner reflector.

35. A diversity receiver according to claim 32, wherein
each of said first pair of antenna elements is a monopole element in operative association with a parabola.

36. A diversity receiver according to claim 32, wherein
each of said first pair of antenna elements is a monopole element in operative association with a parabola.

37. A diversity receiver according to claim 32, further including
- a second pair of parallel spaced, straight, vertical elemental antenna elements disposed substantially parallel to said electric field component and oriented in a predetermined manner with respect to said first pair of antenna elements; and
- a second 180° hybrid circuit coupled to said second pair of antenna elements to provide a third output signal proportional to said electric field component and a fourth output signal proportional to said magnetic field component, wherein
- each of said first and second pair of antenna elements is a monopole antenna in operative association with a parabola.

38. A diversity receiver according to claim 32, further including
- a second pair of parallel spaced, straight, vertical elemental antenna elements disposed substantially parallel to said electric field component and oriented in a predetermined manner with respect to said first pair of antenna elements; and
- a second 180° hybrid circuit coupled to said second pair of antenna elements to provide a third output signal proportional to said electric field component and a fourth output signal proportional to said magnetic field component, wherein
- each of said first and second pair of antenna elements has a length of 0.06 to 0.08 wavelengths at an operating frequency of said antenna, each of said first pair of antenna elements is separated from each other by 0.125 wavelengths at said operating frequency and each of said second pair of antenna elements is separated from each other by 0.125 wavelengths at said operating frequency, wherein
- each of said first and second pair of antenna elements is a monopole antenna in operative assocation with a parabola.

39. A method of constructing a a field component diversity antenna arrangement to receive uncorrelated electric field and magnetic field components of a transmitted signal in a multipath fading environment, wherein said arrangement
- at least a first pair of parallel spaced straight, vertical elemental antenna elements disposed substantially parallel to said electric field component to receive said transmitted signal;
- a first straight conductor connecting said first pair of antenna elements together to enhance said magnetic field component; and
- a first 180° hybrid circuit coupled to said first pair of spaced antenna elements to provide a first output signal proportional to said electric field component and a second output signal proportional to said magnetic field component, said method comprising:
- adjusting said first straight conductor along said first pair of spaced antenna elements to a position at which equal amplitude voltage are obtained in response to said received components.

* * * * *